(12) United States Patent
Cardinali

(10) Patent No.: US 10,092,025 B2
(45) Date of Patent: Oct. 9, 2018

(54) SPAGHETTI-LIKE LONG PASTA SHAPE AND RELATIVE PRODUCTION DEVICE

(71) Applicant: RUSTICHELLA D'ABRUZZO S.P.A., Pianella (PE) (IT)

(72) Inventor: Andrea Cardinali, Pescara (IT)

(*) Notice: Subject to any disclaimer, the term of this patent is extended or adjusted under 35 U.S.C. 154(b) by 0 days.

(21) Appl. No.: 15/119,105

(22) PCT Filed: Feb. 18, 2015

(86) PCT No.: PCT/EP2015/053428
§ 371 (c)(1),
(2) Date: Aug. 15, 2016

(87) PCT Pub. No.: WO2015/139906
PCT Pub. Date: Sep. 24, 2015

(65) Prior Publication Data
US 2017/0049137 A1 Feb. 23, 2017

(30) Foreign Application Priority Data

Mar. 18, 2014 (IT) .............................. PS2014A0003

(51) Int. Cl.
*A23L 7/109* (2016.01)
*A23P 30/20* (2016.01)

(52) U.S. Cl.
CPC .............. *A23L 7/109* (2016.08); *A23P 30/20* (2016.08); *A23V 2002/00* (2013.01)

(58) Field of Classification Search
CPC ....................................................... A23L 7/109
(Continued)

(56) References Cited

U.S. PATENT DOCUMENTS 4,752,205 A * 6/1988 Moriyama ............... A21C 3/04
264/177.1
2008/0199569 A1 8/2008 Baumeister et al.

FOREIGN PATENT DOCUMENTS

| EP | 0450428 A2 | 10/1991 |
| EP | 2401926 A1 | 1/2012 |
| FR | 2738461 A1 | 3/1997 |

OTHER PUBLICATIONS

Italshop, Strangoloni di Semola, [on line] 2013—no month given, retrieved Nov. 9, 2017. Retrieved from the Internet: URL:<http://italshop.at/pasta/strangoloni-di-semola-500g.html#!prettyPhoto>.*

(Continued)

Primary Examiner — Erik Kashnikow
Assistant Examiner — C A Smith
(74) Attorney, Agent, or Firm — Themis Law

(57) ABSTRACT

Spaghetti-like long shaped pasta having a continuous internal longitudinal cavity communicating with the outside through a co-extended longitudinal slot with convex edges closing the internal cavity; and device for production thereof that includes an extrusion drawing having, on the entry front, least two holes each having complementarily identical openings for introduction within respective channels of identical shape, configuration and size that end in a joint discharge channel, near an edge of an expanded head. An occlusion of the outlet hole of the discharge channel includes a septum separating the delivery channels, causing the two flows of extruded pasta to join solely on a peripheral portion, opposite to the edge, the expanded head producing the central compartment, developing longitudinally within the finished product and communicating with the outside through a co-extended cutting or fissure.

4 Claims, 6 Drawing Sheets

(58) Field of Classification Search
USPC .......................................................... D1/126
See application file for complete search history.

(56) References Cited

OTHER PUBLICATIONS

Pasta Shapes, [on line] Jan. 9, 2017. Retrieved Nov. 9, 2017. Retrieved from the Internet: URL:<https://web.archive.org/web/20120114050734/http://www.pasta-recipes-by-italians.com/pasta-shapes.html>.*

Italshop, Strangoloni di Semola, [on line] 2013—no month given, retrieved Nov. 9, 2017. Retrieved from the Internet: URL:<http://italshop.at/strangoloni-di-semola-500g.html#!prettyPhoto>.*

Pasta Shapes, [on line] Jan. 2012, retrieved Nov. 9, 2017. Retrieved from the Internet: URL:<https://web.archive.org/web/20120114050734/http://www.pasta-recipes-by-italians.com/pasta-shapes.html>.*

* cited by examiner

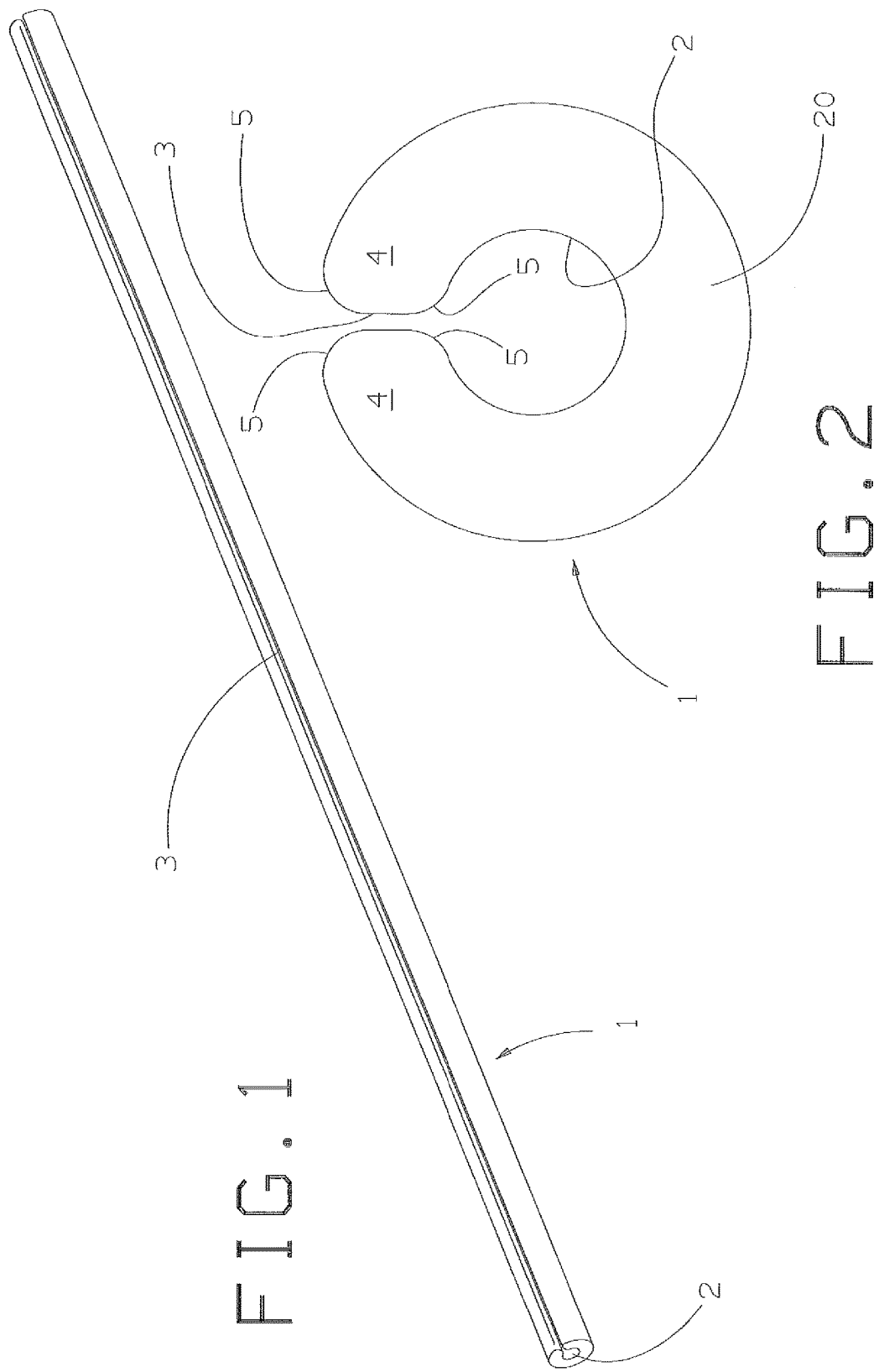

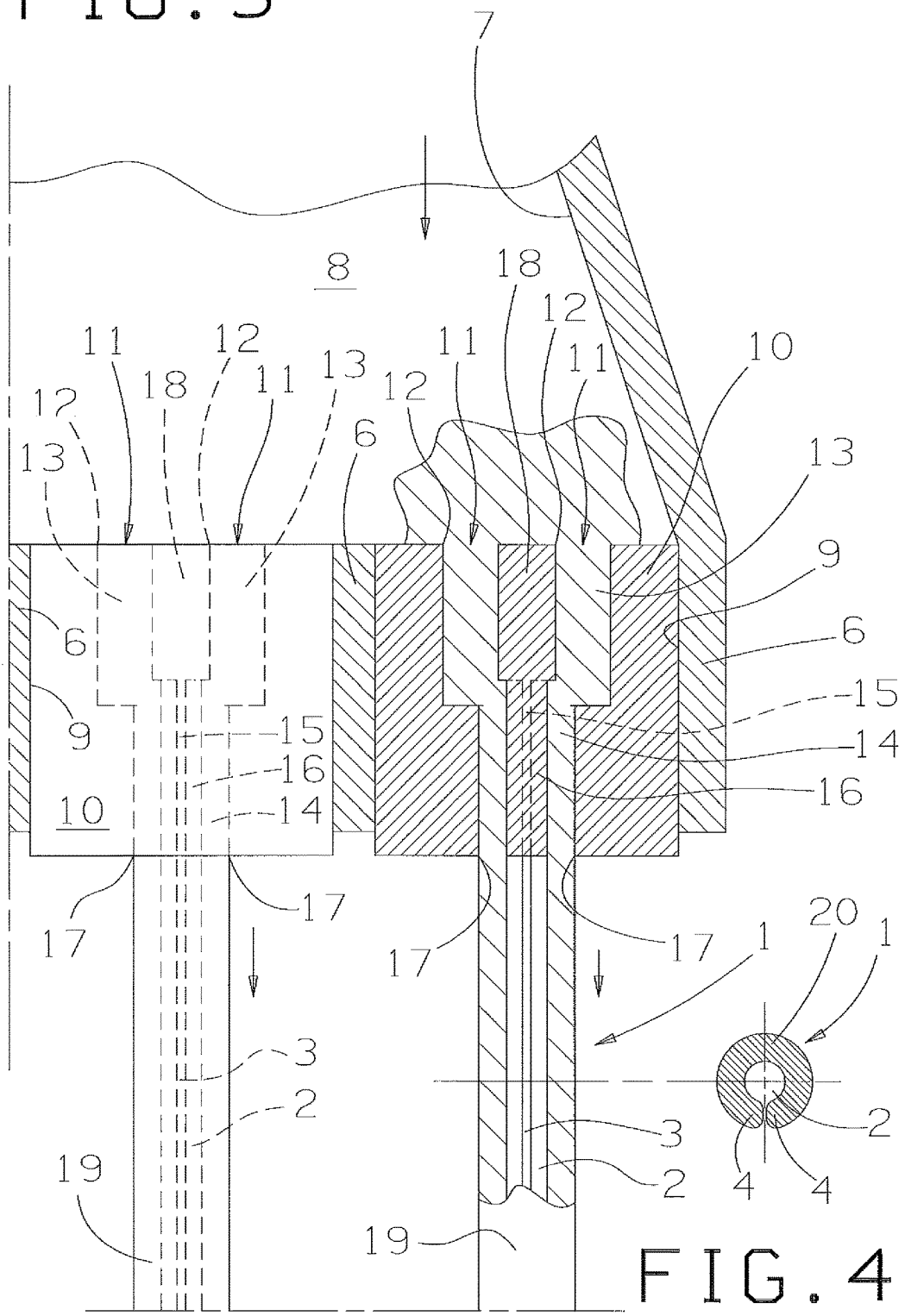

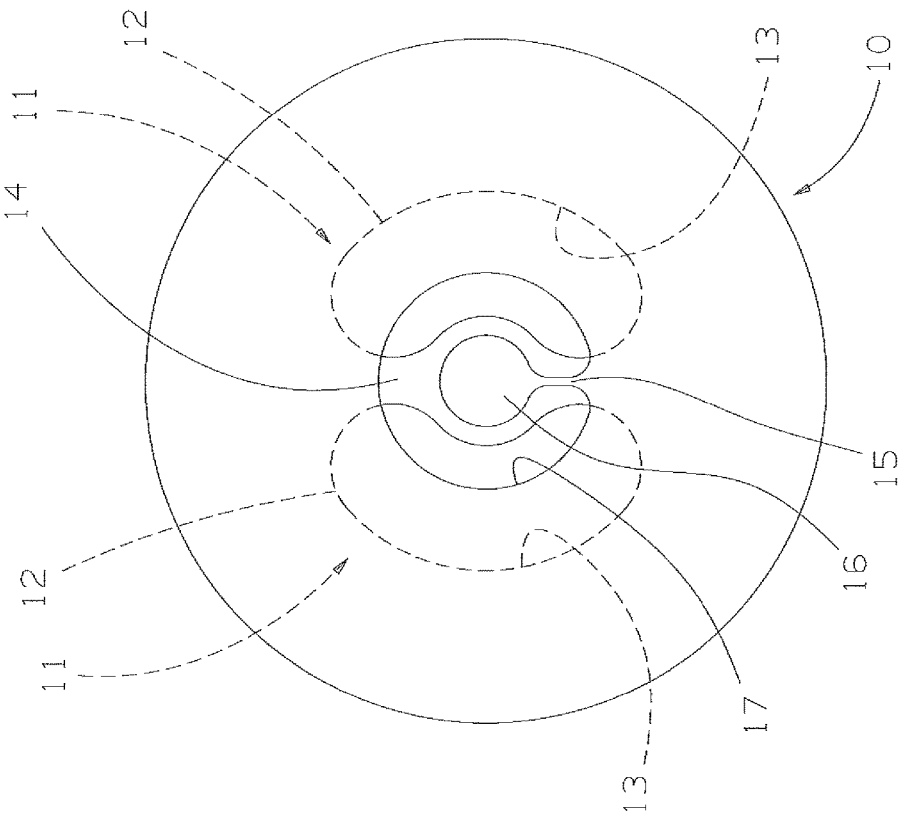
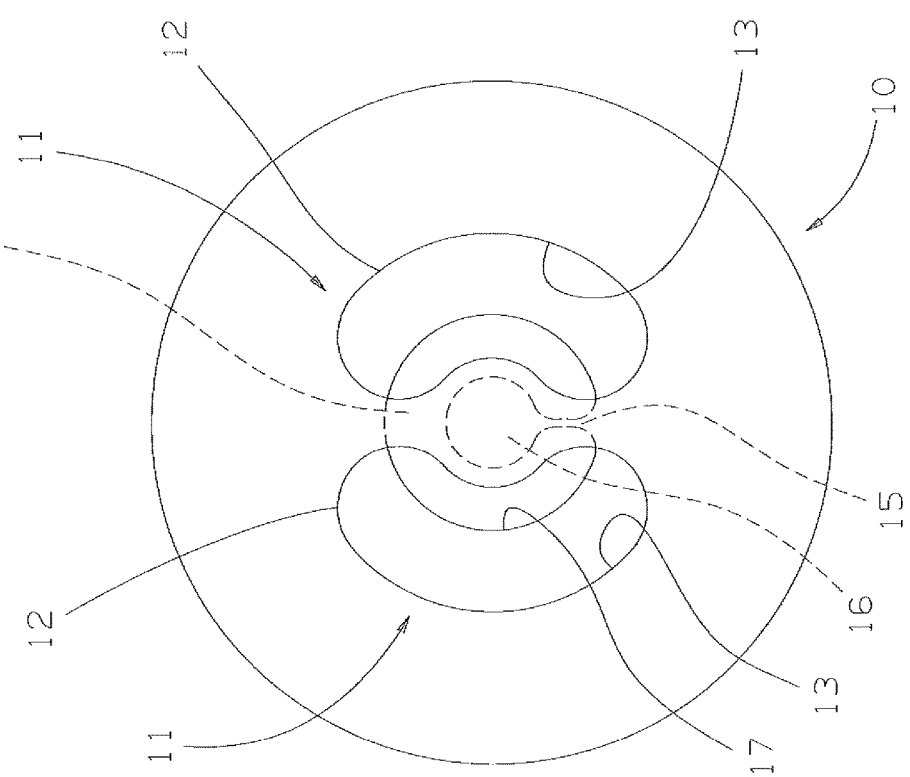

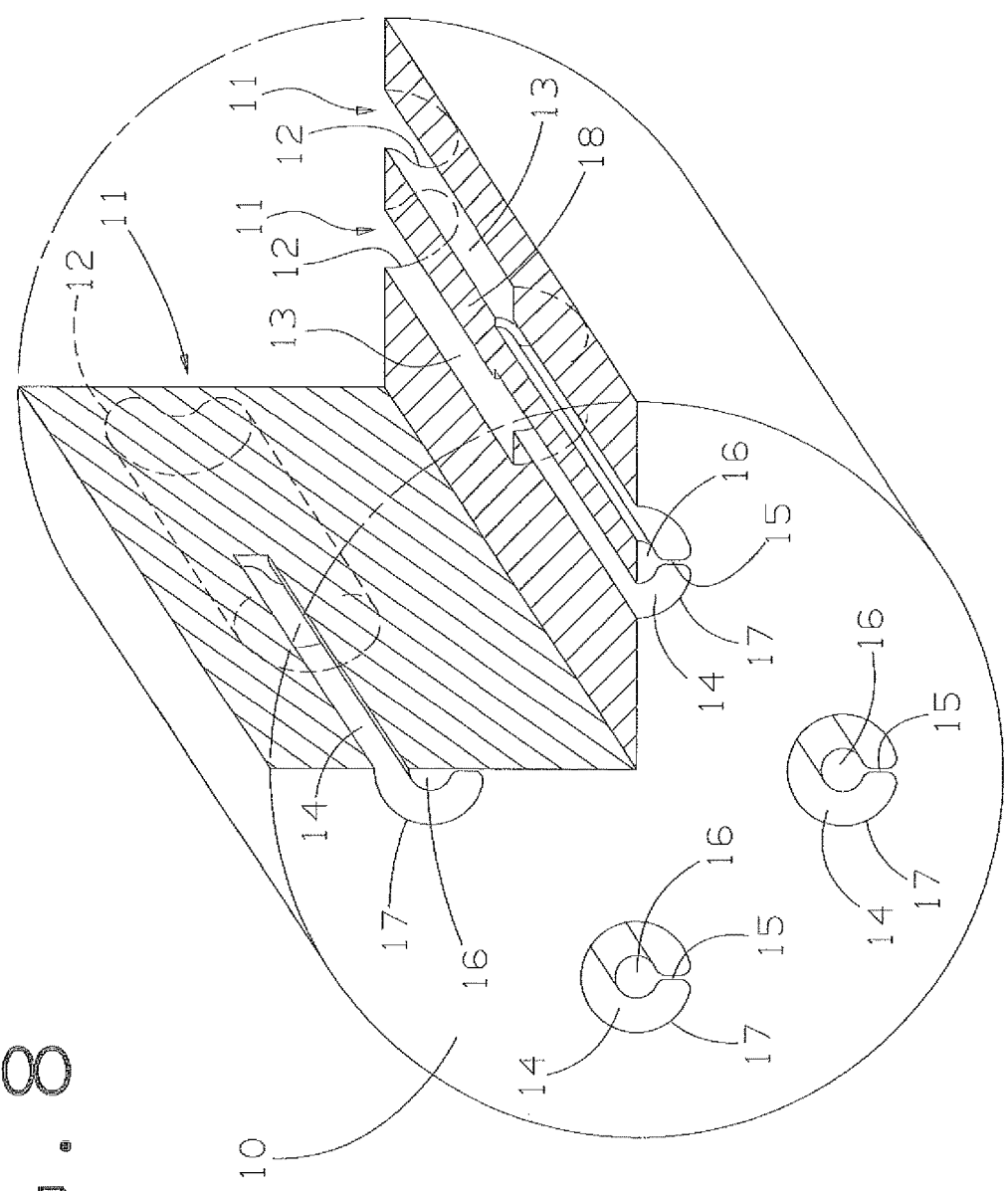

SPAGHETTI-LIKE LONG PASTA SHAPE AND RELATIVE PRODUCTION DEVICE

DETAILED DESCRIPTION

Technical Field of the Invention

Both in private kitchens and restaurants, there arises the need of reducing pasta cooking times, with the aim of preparing it at home, or serving upon request, in a few minutes.

An empirical answer to this need is usually provided, especially in the restaurant industry, with the food pre-cooking technique, which is removed in advance from the cooking water and kept partly raw in the estimated amount with respect to the overall need and then, within a few minutes, it is brought to the desired level of cooking through new boiling at the required amounts.

This technique considerably jeopardises the organoleptic characteristics of the food, the respective perceptions to touch and taste.

In the specific spaghetti industry and similar long pasta, to which the present invention refers, there has already been conceived a solution concept, described in the Italian Industrial Invention patent n. IT 1201244B and in the homologous U.S. Pat. No. 4,752,205B, which provides for making, during the forming stage, one or more longitudinal grooves in the body of the pasta thread, so that during the boiling the mass to be subjected to boiling is lesser and more exposed and thus further reduce the cooking times.

Though attaining the reduction of the product cooking times, this solution concept does not allow maintaining, in the product, shape characteristics similar to the spaghetti when cooked, in that the fins at the sides of the grooves are open, so that the cooked product substantially appears as a "folded tagliatella", or something similar in terms of irregular shape;

in addition, the product is not even pleasant to touch and taste, in that it is not uniform in terms of firmness, especially with reference to the ends of the fins, which entirely lose consistency, in that they have a non-uniform thickness with respect to the rest of the product.

OBJECTS OF THE INVENTION

Thus, the main object of the present invention, in the context outlined above, is to provide a pasta shape of the spaghetti type, or the like, capable of allowing a radical reduction of the cooking times.

Another object of the present invention is to attain the aforementioned main object of reducing the cooking times but with uniform cooking of the product itself over the entire relative length, thickness and shape, through a pasta shape capable of allowing maintaining the organoleptic characteristics, of touch, flavour and aspect, substantially comparable with the classic analogous ones provided according to the prior art.

Another object of the present invention is to provide a device for the obtainment and industrial production of the pasta shape according to the present invention, capable of being utilised in pasta production lines according to the prior art.

A further object of the present invention is to attain the aforementioned objects through a simple and efficient implementation concept, that is safe in operation and relatively inexpensive considering the results that can be practically attained therewith.

SUMMARY EXTRACT OF THE SOLUTION CONCEPT

These and other objects shall be attained with the spaghetti-like long pasta shape according to the present invention, comprising, within the straight thread-like pasta body (1) a preferably circular section, a continuous internal longitudinal cavity (2) preferably centred to generate walls of homogeneous thickness, communicating with the external through a co-extended longitudinal cut (3) of the body (1), defined by pasta strips (4) with rounded angles (5) mutually approached to close the internal cavity (2) without coming to contact with the raw product; as well as with the device for the relative production according to the present invention, comprising an extrusion drawing (6) with matrix extruders (10), preferably made of bronze or Teflon, constituted on the entry front by at least two holes (11) for each through drawing element (13, 14), having a complementarily identical opening for introduction (12) within respective channels (13), having a complementarily identical shape, configuration and size; said introduction channels (13) terminating in a joint discharge channel (14), near an edge (15) with an expanded head (16), preferably cylindrical, positioned and shaped to partly occlude up to the outlet hole (17) said discharge channel (14), such occlusion being centrally partialised and on a segment or radius contiguous—in a coplanar manner—to at least one septum (18) for separating the delivery channels (13), so as to allow the joining of the two flows (19) of extruded pasta solely on a peripheral portion (20), preferably arch-shaped, opposite to said edge (15), said expanded head (16) constituting a matrix for the central compartment (2), developing longitudinally within the finished product (1) alongside the latter, communicating with the external through a co-extended cutting or fissure (3) of failed joining of the flows of product (19) due to the minor thickness of the edge (15).

DESCRIPTION OF THE ATTACHED DRAWINGS

Further characteristics and advantages, of the pasta shape and of the device for the relative production according to the present invention, shall be more apparent from the following detailed description of a relative preferred but non-exclusive embodiment, represented solely by way of non-limiting example by four attached drawings, wherein:

FIG. 1 shows a perspective view of the spaghetti-like long pasta shape according to the present invention.

FIG. 2 shows a cross-sectional view of the spaghetti-like long pasta shape according to the present invention.

FIG. 3 shows a longitudinal sectional view of a schematic portion of a production plant of the spaghetti-like long pasta shape according to the present invention, comprising the devices for the relative production according to the present invention, also longitudinally sectioned.

FIG. 4 shows a cross-sectional view of the spaghetti-like long pasta shape according to the present invention as produced by the plant of FIG. 3.

FIG. 6 shows a front view of the device for producing the spaghetti-like long pasta shape according to the present invention on the entry front of the product to be shaped.

FIG. 7 shows a front view of the device for producing the spaghetti-like long pasta shape according to the present invention on the outlet front of the shaped product.

FIG. 8 shows a sectional and transparent perspective view of the device for producing the spaghetti-like long pasta shape according to the present invention.

STATIC DESCRIPTION OF THE EMBODIMENT

Figure 5:
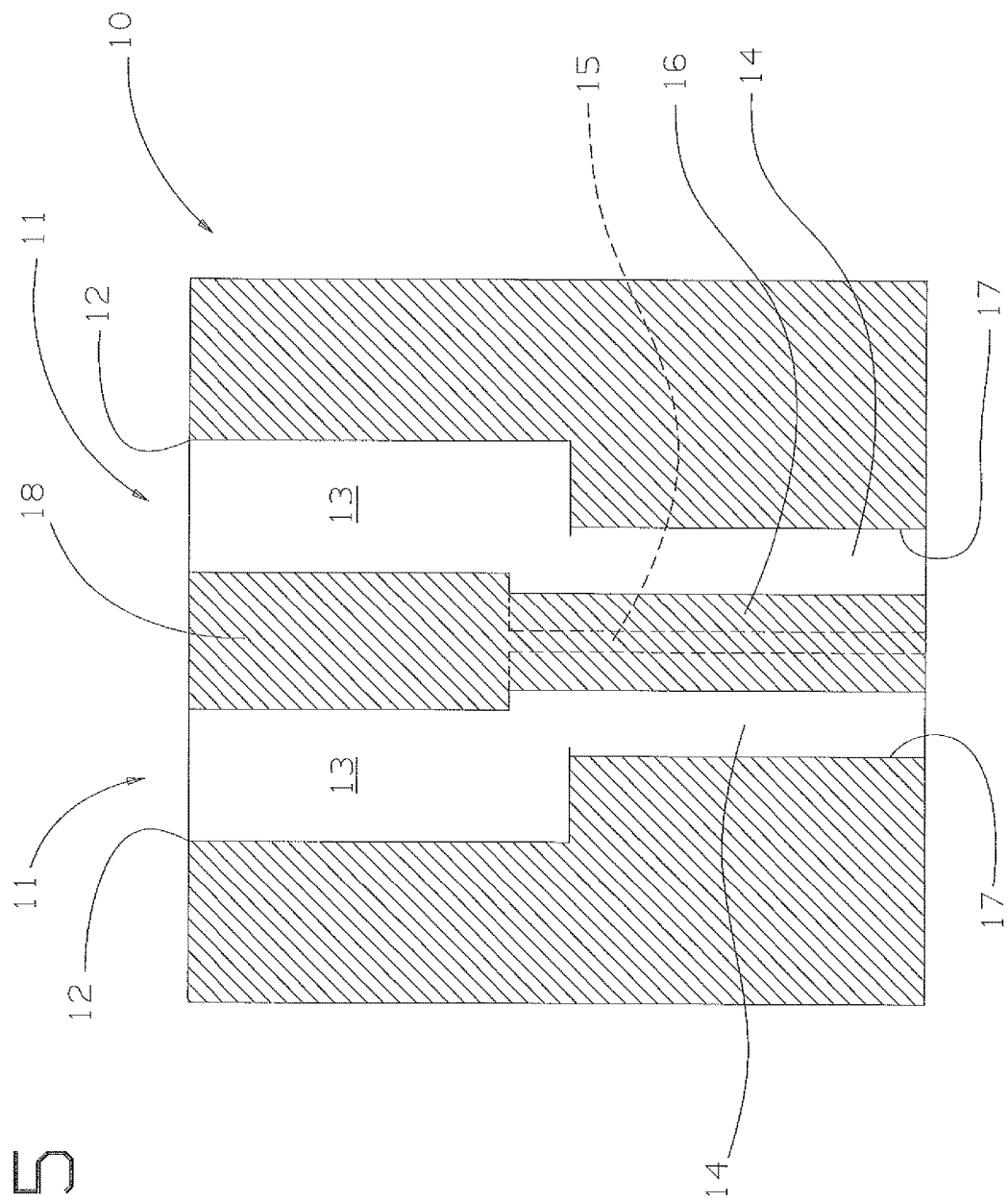
FIG. 5 shows a longitudinal sectional view of a device for producing the spaghetti-like long pasta shape according to the present invention.
Figure 9:
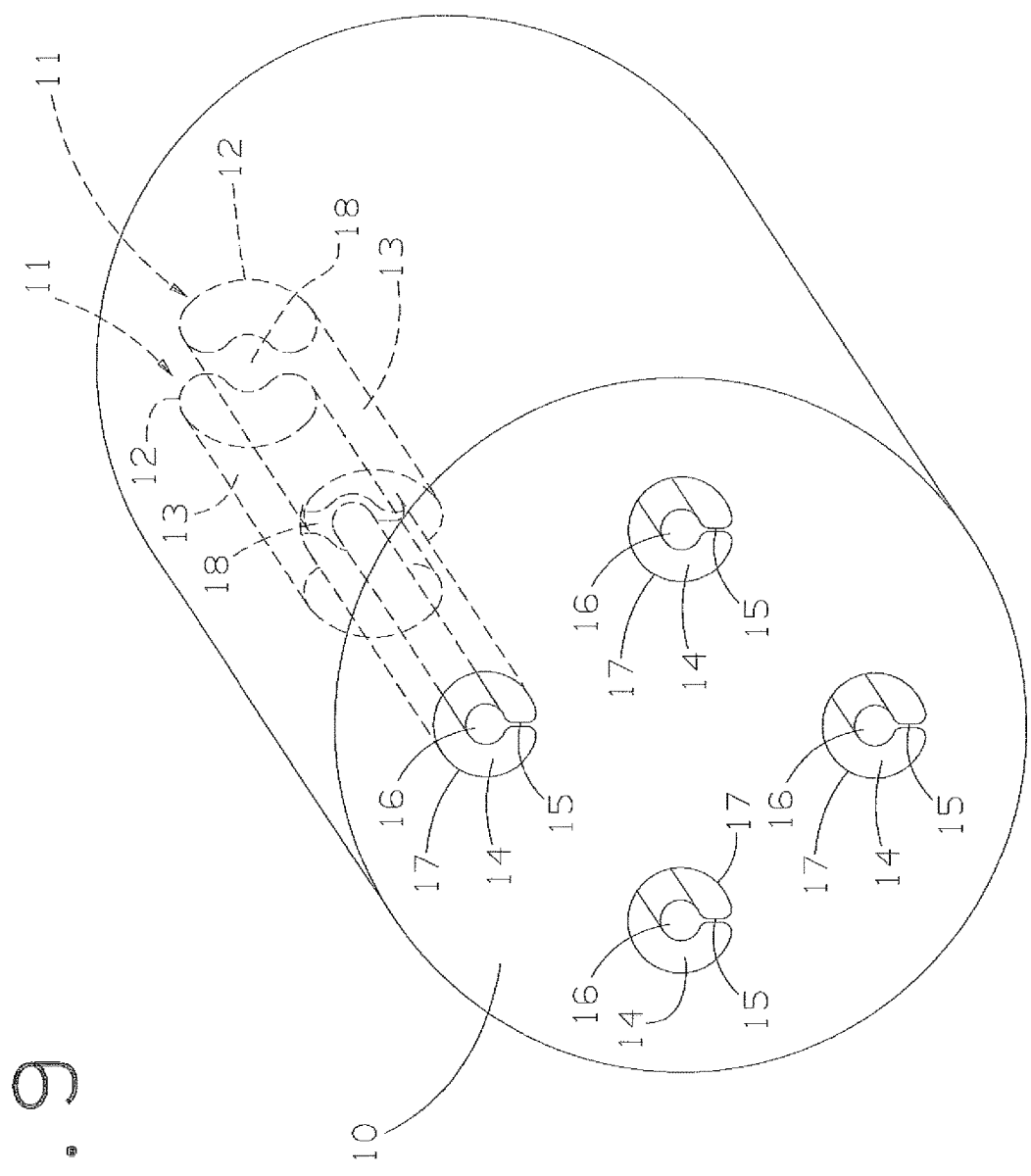
FIG. 9 shows a transparent perspective view of the device for producing the spaghetti-like long pasta shape according to the present invention.

With reference to such figures, and in particular FIG. 1, the spaghetti-like long pasta shape according to the present invention, comprising, within the straight thread-like pasta body 1, with a preferably circular section, a continuous internal longitudinal cavity 2, communicating with the external through a co-extended longitudinal cut 3 of the body 1, defined by strips 4 of pasta rounded angles 5, mutually approached to close the internal cavity 2, without coming to contact with the raw product is indicated in its entirety with 1.

In FIG. 3, with 6 there is partly schematically illustrated in longitudinal section a drawing of a pasta production plant, such drawing 6 to be deemed rectangular-shaped, as usual for long pasta shapes, with the aim of attaining the extruded filaments 1 in line, similar to a curtain, to allow the relative removal by the piling canes, not illustrated, thus made to pass in succession in the appropriate step according to the extrusion speed, as known in the prior art.

On the drawing 6, with 7 there is schematically indicated the compression chamber, wherein an auger-like device positioned at the upper part, not illustrated, presses a pasta mass 8.

Through the drawing 6 there are made holes 9, for inserting through drawing inserts 10 for example cylindrical and preferably made of bronze or Teflon, or matrix extruders 10 specifically constituting the device for producing the spaghetti-like long pasta shape 1 according to the present invention.

The matrix extruders 10 have any plurality of through drawings, for example four in the described embodiment, comprising on the entry front of the pressed mass 8 at least two holes, indicated in their entirety with 11 (see FIGS. 5 and 6), provided with a complementarily identical opening for introduction 12 within respective channels 13 having a complementarily identical shape, configuration and size.

The introduction channels 13 terminate in a joint discharge channel 14 (see FIGS. 5 and 7), near an edge 15, with expanded head 16, preferably cylindrical, and profile connected in an arched manner to the wall of the discharge channel 14 and to said head 16.

The edge 15, with relative expanded head 16, is positioned and shaped to partly occlude, up to the outlet hole 17, said discharge channel 14; such occlusion is centrally partialised at the head 16 and on a segment or radius, i.e. at the edge 15, contiguous—in a coplanar manner—to at least one septum 18 for separating the delivery channels 13 so as to allow the joining of the two flows of extruded pasta 19 solely on a peripheral portion 20 preferably arch-shaped, opposite to said edge, for the functions specified hereinafter.

Dynamic Description of the Embodiment

Thus, having completed the static description of a preferred embodiment of the pasta shape and the device for the relative production according to the present invention, below is the dynamic description, or the relative operation:

like in the plants according to the prior art, the auger, not illustrated, presses about 140 bars the irregular pasta mass 8 within the compression chamber 7, from which it extrudes in line through the through holes of the drawing of the drawing inserts 10.

In each of these, the pasta penetrates into the identical complementary channels 13 through the inlets 12 of the inlet holes 11, forming two or more flows of extruded pasta 19, which converge near the partitioning edge 15 and around the cylindrical expanded head 16 within the discharge channel 14.

Said expanded head 16 constitutes a matrix for the central compartment 2 developing longitudinally within the finished product 1 alongside the latter, communicating with the external through a co-extended cutting or fissure 3 of failed joining of the two flows 19 of product, defined within the discharge channel 14 by the thickness of the partitioning edge 15.

The curved fittings of the partitioning edge 15 on the surface of the channel 14 and the expanded head 16 in turn define the rounding 5 of the corners of the strips 4 of pasta which define the longitudinal cutting 3 for communication with the inner compartment 2 in the finished product 1.

Such extrusion procedure, preventing the free convergence of the two original identical flows 19 of pasta within the discharge channel 14, though forcing them to reduce within the gap that remains therein on the sides of the partitioning edge 15 of the discharge channel 14 and around the cylindrical head 16, causes the densification of the matter, mainly at the small linear front for joining the flows 19, or at the peripheral portion 20 of the pasta-body 1 opposite to the longitudinal cutting 3.

Such densification integrates in the finished product an "elastic memory", so that when it is boiled the relative cooking times are radically lesser, given that the pasta is exposed to the cooking water both on the outer surface and on the inner surface within the channel 2, but the pasta strips 4 defining the continuous longitudinal cutting 3 do not end up splitting like in the prior art, but on the contrary they tend to converge and contrary to the prior art solutions the relative increase of cooking volume leads to close the longitudinal cutting 3 in the cooked product, which takes up a spaghetti-like shape, which substantially cannot be distinguished from it, wherein the rounding of the corners 5 of the original strips 4 prevents the presence of thin angular appendages which tend to tear during the cooking.

The section of the product, somehow similar to an "open toroid", which is a major characteristic of the invention, allows obtaining a thickness of the pasta substantially uniform at all points, this being a fundamental condition for attaining a uniform cooking.

Alternative Embodiments

It is obvious that in further alternative embodiments, still falling within the same concept solution under the embodiment illustrated above and claimed below, the pasta shape with device for the relative production according to the present invention, may be obtained or implemented with equivalent technical and structural elements, or provided with further supplementary solutions, same case applying to all configurations of the relative constituents and the implementation interventions may vary to suit the purpose.

Firstly, the spaghetti shape may have any alternative shape with respect to the circular one described in the example, for example square/rectangular/triangular-shaped, like in the so-called "spaghetti alla chitarra", or "bavette", or ellipsoidal like in the so-called "linguine" or "trenette", or any other shape.

The inlet holes and the delivery channels may be more than two, for example three, especially for pasta shapes or similar with larger dimension, wherein the edge or the like of the single outlet conduit shall in this case be positioned to continue one of the three septa that separate the three delivery units.

There may be provided an alternative embodiment of the device wherein the edge with expanded head of the discharge channel is conceived with a given small distance from the partitioning septum of the convergence flows, thus acquiring the function, also possibly the configuration, of a plough which detaches the previously joined flows.

Advantages of the Invention

As clearly observable from the afore-outlined description of a preferred embodiment and also as mentioned above regarding some variant embodiments, the pasta shape with device for the relative production according to the present invention offers advantages corresponding to the attainment of the preset objects and even others:

it integrates a solution adapted to attain a common pasta shape, probably the most common worldwide, suitable to be designed drastically reducing the cooking times, without pre-cooking or using pre-gelatinised flower/meal and maintaining the organoleptic characteristics under all aspects substantially comparable to the homologous conventional product.

KEY TO THE REFERENCE NUMBERS 1) spaghetti shape in its entirety
2) continuous internal longitudinal cavity of the spaghetti shape
3) continuous longitudinal cutting of the spaghetti shape
4) pasta strips of equal thickness defining the continuous longitudinal cutting
5) rounded angles of the pasta strips defining the continuous longitudinal cutting
6) drawing of the production plant
7) chamber for the compression of the pasta mass
8) pasta mass
9) drawing holes for introducing drawing inserts or matrix extruders
10) drawing inserts or matrix extruders
11) inlet holes in their entirety
12) opening of the inlet holes
13) introduction channels or delivery channels
14) discharge channel
15) edge for partitioning the discharge channel
16) cylindrical expanded head of the edge for partitioning the discharge channel
17) outlet hole
18) septum for separating introduction channels or delivery channels
19) flows of extruded pasta
20) peripheral portion of the spaghetti shape opposite to the longitudinal cutting

The invention claimed is:

1. A spaghetti-shaped elongated pasta comprising:
a straight thread-shaped pasta body having a single continuous internal longitudinal cavity communicating with an outside through one co-extended longitudinal slot in the body, the slot being defined by edges of pasta strips mutually approached to essentially close the internal cavity without coming to contact with one another,
wherein the continuous internal longitudinal cavity is centered to obtain walls with homogeneous thickness, communicating with the outside through the co-extended longitudinal slot in the body,
wherein the edges have rounded end portions, and
wherein a density of the pasta body in a portion of the pasta body opposite to the longitudinal slot is higher than the density of the pasta body in a remaining portion of the pasta body.

2. The spaghetti-shaped elongated pasta according to claim 1, wherein the pasta body has a diameter comprised between 1 mm and 10 mm.

3. The spaghetti-shaped elongated pasta according to claim 1, wherein the edges defining said continuous internal longitudinal cavity have a thickness comprised between 0.5 mm and 3.5 mm.

4. The spaghetti-shaped elongated pasta according to claim 1, wherein said continuous internal longitudinal cavity has a diameter comprised between 0.2 mm and 6 mm.

* * * * *